United States Patent [19]
Hoff et al.

[11] Patent Number: 5,462,405
[45] Date of Patent: Oct. 31, 1995

[54] COOLABLE AIRFOIL STRUCTURE

[75] Inventors: Richard W. Hoff, Glastonbury; David R. Martin, East Hartford, both of Conn.

[73] Assignee: United Technologies Corporation, Hartford, Conn.

[21] Appl. No.: 262,396

[22] Filed: Jun. 20, 1994

Related U.S. Application Data

[63] Continuation of Ser. No. 981,952, Nov. 24, 1992, abandoned.

[51] Int. Cl.⁶ ..................................................... F01D 5/18
[52] U.S. Cl. ........................................ 416/97 R; 415/115
[58] Field of Search ............................ 416/97 R, 96 R, 416/96 A; 415/115, 116

[56] References Cited

U.S. PATENT DOCUMENTS

| | | | |
|---|---|---|---|
| 4,278,400 | 7/1981 | Yamarik et al. | 416/97 R |
| 4,474,532 | 10/1984 | Pazder | 416/97 R |
| 4,752,186 | 6/1988 | Liang | 416/97 R |
| 4,753,575 | 6/1988 | Levengood et al. | 416/97 R |
| 4,992,026 | 2/1991 | Ohtomo et al. | 416/97 R |

FOREIGN PATENT DOCUMENTS

| | | | |
|---|---|---|---|
| 135606 | 7/1985 | Japan | 416/96 R |
| 66401 | 3/1989 | Japan | 416/94 R |
| 845227 | 8/1960 | United Kingdom . | |
| 2005775 | 4/1979 | United Kingdom . | |

OTHER PUBLICATIONS

Drawing of the first stage turbine blade for the V-2500-A1 engine, International Aero Engines, 1991.

*Primary Examiner*—Edward K. Look
*Assistant Examiner*—James A. Larson
*Attorney, Agent, or Firm*—Gene D. Fleischhauer

[57] ABSTRACT

A coolable airfoil having internal cooling passages 82, 84, 74 is disclosed. Various construction details are developed to increase cooling in critical locations of the airfoil. In one embodiment, a pair of side-by-side spanwisely extending passages 82, 84 flow cooling air to the tip passage 74 which extends rearwardly in a flag-like manner.

6 Claims, 2 Drawing Sheets

COOLABLE AIRFOIL STRUCTURE

This application is a continuation of application Ser. No. 07/981,952, filed Nov. 28, 1992, abandoned.

TECHNICAL FIELD

This invention relates to coolable airfoil structures of the type used in high temperature rotary machines, and more specifically, to structure for providing cooling fluid to a critical location of the airfoil. The concepts disclosed have application to both turbine vanes and turbine blades.

BACKGROUND ART

An axial flow rotary machine, such as a gas turbine engine for an aircraft, includes a compression section, a combustion section and a turbine section. A flow path for hot working medium gases extends axially through the engine. The flow path for hot gases is generally annular in shape.

As working medium gases are flowed along the flow path, the gases are compressed in the compression section causing the temperature and pressure of the gases to rise. The hot, pressurized gases are burned with fuel in the combustion section to add energy to the gases. These gases are expanded through the turbine section to produce useful work and thrust.

The engine has a rotor assembly in the turbine section which is adapted by a rotor disk and blades extending outwardly therefrom to receive energy from the hot working medium gases. The rotor assembly extends to the compression section. The rotor assembly has compressor blades extending outwardly across the working medium flow path. The high-energy working medium gases in the turbine section are expanded through the turbine blades to drive the rotor assembly about its axis of rotation. The compressor blades rotate with the rotor assembly and drive the incoming working medium gases rearwardly, compressing the gases and imparting a swirl velocity to the gases.

Each rotor blade has an airfoil to direct the hot working medium gases through the stage of rotor blades and to receive work from the gases. As a result, the airfoils are bathed in hot working medium gases during operation causing thermal stresses in the airfoils. These thermal stresses affect the structural integrity and fatigue life of the airfoil. In addition, rotational forces acting on the rotor blade as the rotor blade is driven about the axis of rotation further increase the stresses to which the blade is subjected.

Rotor blades are typically cooled to reduce thermal stresses and thereby provide the rotor blade with a satisfactory structural integrity and fatigue life.

An example of such a rotor blade is shown in U.S. Pat. No. 4,474,532 entitled "Coolable Airfoil For a Rotary Machine", issued to Pazder and assigned to the assignee of this application. Another example of a coolable rotor blade is shown in U.S. Pat. No. 4,278,400 issued to Yamarik and Levengood entitled "Coolable Rotor Blade" and assigned to the assignee of this application. Each of these rotor blades is provided with a plurality of cooling air passages on the interior of the blade. Cooling air is flowed through the passages to the rearmost portion of the rotor blade, commonly referred to as the trailing edge, from whence the cooling air is exhausted into the working medium flow path.

The above art notwithstanding, scientists and engineers working under the direction of applicant's assignee are seeking to develop coolable airfoils for use in high temperature rotary machines which have acceptable level of stresses in critical regions of the airfoil.

DISCLOSURE OF INVENTION

According to the present invention, a coolable airfoil having a passage for cooling one end of the airfoil is supplied with cooling air from the other end of the airfoil via two spanwisely extending passages with the forward passage supplying film cooling air to the exterior of the airfoil to shelter the rear passage from the hot working medium gases on the interior of the engine.

In accordance with one detailed embodiment of the invention, the tip passage extends rearwardly to the trailing edge of the airfoil and is bounded by both the pressure sidewall and the suction sidewall in the trailing edge region of the blade.

In accordance with one detailed embodiment of the invention, the pressure sidewall is substantially planar over the entire length of the airfoil and the suction sidewall diverges from the pressure sidewall in the tip region of the airfoil to provide a thickened tip to the airfoil.

A primary feature of the present invention is a coolable airfoil having a pair of passages extending spanwisely from one end of the airfoil to the other. The passages are in flow communication with a source of cooling air. Another feature is that the forward most passage is in flow communication with the exterior of the airfoil via film cooling holes. The holes extend over at least 50% of the span of the airfoil on at least one of the sidewalls. In one detailed embodiment, the passages are in flow communication with a tip passage. The tip passage extends to the trailing edge region. Another feature is a suction sidewall and a pressure sidewall which bound the tip passage to the trailing edge region of the airfoil. In one detailed embodiment, the tip of the airfoil is thicker in the circumferential direction than in the remainder of the airfoil.

A primary advantage of the present invention is the level of fatigue life which results from cooling the tip region with cool air provided from a sheltered cooling air supply passage. Another advantage is the size of the tip which permits the deposition of abrasive particles of varying sizes and mounts as compared with airfoils having less thick tip regions. Another advantage is the cooling effectiveness which results from having the sidewalls extend to the trailing edge to shelter the interior of the airfoil from the hot working medium gases.

Other features and advantages will be apparent from the specification in claims and from the accompanying drawings which illustrate an embodiment of the invention.

BEST MODE FOR CARRYING OUT THE INVENTION

Figure 1:
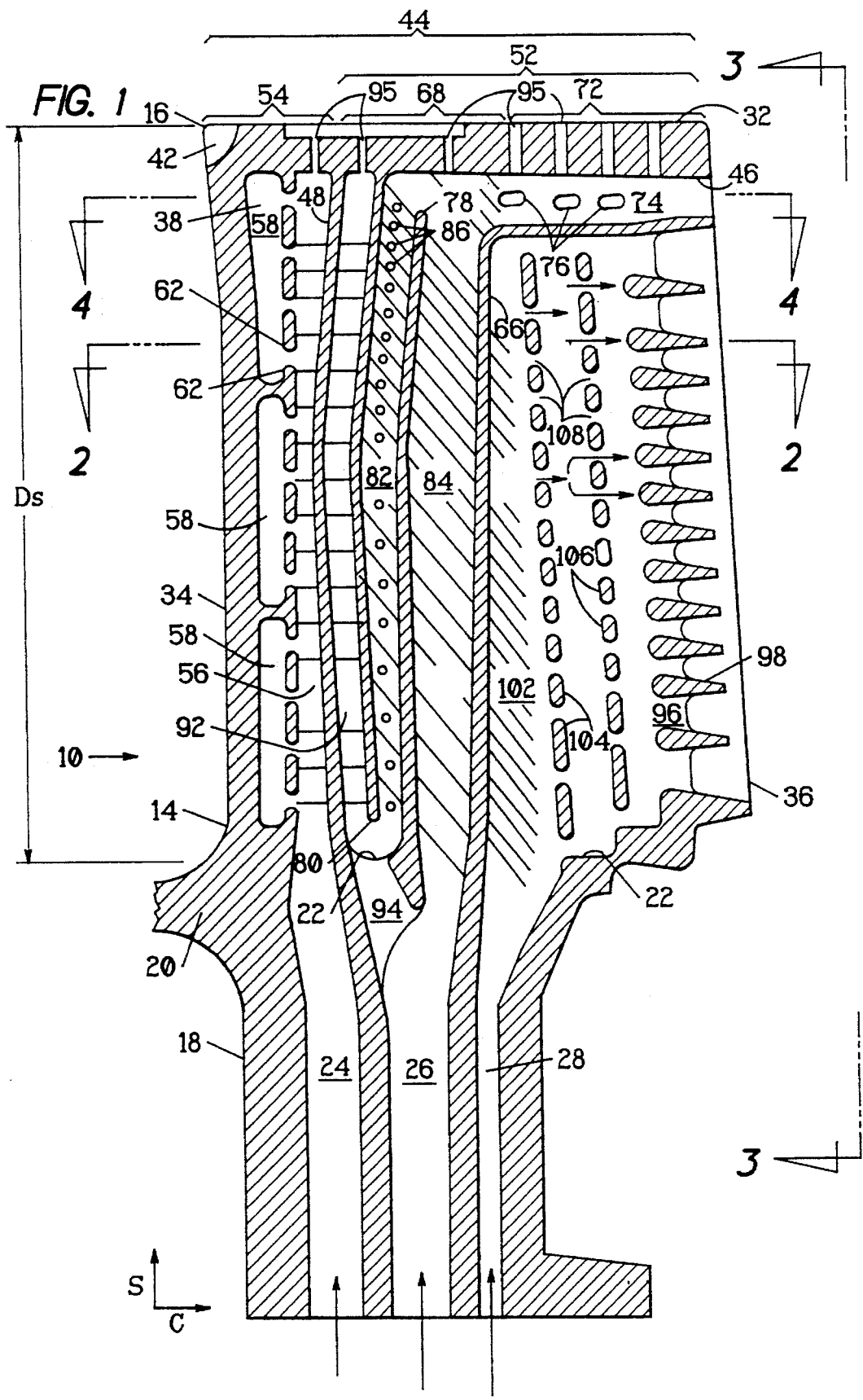
FIG. 1 as a side elevation view of an airfoil, such as a rotor blade, partly in section and partly broken away to show the suction sidewall of the interior of the airfoil.

FIG. 1 shows an airfoil structure such as a rotor blade 10, for a rotary machine. The airfoil structure includes an airfoil section 12 having a first or innermost end 14 and a second or outermost end 16. The rotor blade has a spanwise reference direction S and chordwise reference direction C. The airfoil has a length (span) $D_S$ between its innermost end and its outermost end. As will be realized, the airfoil structure might be a stator vane.

The rotor blade has a root section 18 and platform section 20 adjacent to the first end. The root section is adapted to engage the rotor of a rotary machine.

The root section has a chordwisely extending root wall 22. A first duct 24, a second duct 26, and a third duct 28 are in flow communication with a source of cooling air, such as a compressor (not shown). The platform section is adapted to form a portion of the inner wall of the flow path for working medium gases in a rotary machine. The airfoil section 12 is adapted to extend outwardly across the working medium flow path and has a tip region 32 at its most outward (outermost) end.

The airfoil section has a leading edge 34 and a trailing edge 36. A suction sidewall 38 and a pressure sidewall 42 (partially broken away in FIG. 1 for clarity and shown in FIG. 2) are joined at the leading edge and the trailing edge. The pressure sidewall is spaced from the suction sidewall to form a cavity 44 therebetween. An internal tip wall 46 extends between the pressure sidewall and the suction sidewall to bound the cavity in the spanwise direction. An internal wall, such as a first rib 48, extends in the spanwise direction to the tip wall and is spaced from the leading edge to divide the cavity into a rear portion 52 and a front portion 54. The front portion has at least one passage as represented by the first passage 56. In the embodiment shown, the leading edge has a plurality of impingement spaces 58 disposed in the first passage. A rib 62 is disposed in the first passage to bound the impingement spaces. The rib has impingement holes 64 extending therethrough which supply the impingement spaces to provide an impingement cooling to the leading edge.

The rear portion 52 has a second rib 66. The second rib extends in the spanwise direction and is spaced chordwisely from the first rib 48. The second rib also divides the rear portion of the cavity into a trailing edge region 72 and a midchord region 68. The second rib also extends in the chordwise direction and is spaced spanwisely from the tip wall leaving a tip passage 74 in flow communication with the mid-chord region 68. Cooling air holes 76 extend from the tip region to the exterior.

The rear portion has a third rib 78. The third rib is spaced from the tip wall. The third rib extends in the spanwise direction to divide the mid-chord region of the blade into a second passage 82 and a third passage 84 which each extends spanwisely from the mot region 18. Each passage is in flow communication with the second duct 26 and in flow communication with the tip passage 74. A plurality of film cooling holes 86 are in flow communication with the second passage. The holes extend from the interior of the airfoil to the exterior of the airfoil. The holes extend over at least the outermost fifty (50%) percent of the span of at lest one of the sidewalls. In the embodiment shown the holes extend over 60% of the span on the suction sidewall surface and over 90 % of the span on the pressure sidewall adjacent the second passage. The holes on the pressure side surface are not shown because the pressure sidewall is broken away for clarity. In another embodiment, the holes extend through the suction sidewall over at least the outermost fifth (50%) percent of the span of the airfoil and over at least the outermost eighty (80%) percent of the span of the airfoil. As noted above, the holes extend through the pressure sidewall.

The rear portion 52 has a fourth rib 80. The fourth rib extends spanwisely from the tip wall 46 to the root region 18 and is spaced from the root wall 22. The fourth rib bounds the second passage 82 and is spaced from the first rib leaving a fourth radially extending passage 92 therebetween. A spanwisely extending supply passage 94 extends from the second duct 26 to the second and fourth passages 82, 92 to place the second and fourth passages in flow communication with the second duct. A plurality of radial holes 95 in the tip region place the passages 58, 92,82, 84, and 74 in flow communication with the exterior of the blade.

The trailing edge region has a plurality of slots 96 at the rear of the airfoil. The slots are bounded by tear-drop shaped pedestals or lands 98 which extend from the pressure sidewall 42 to the suction sidewall. The trailing edge region includes a fifth spanwisely extending 102 passage. The fifth passage is space chordwisely from the slots for ducting cooling air into the trailing edge region. A pair of spanwisely extending ribs 104, 106 are disposed between the fifth supply passage and the slots. Each has a plurality of impingement 108 holes extending therethrough to direct cooling air against adjacent structure. For example, the holes in the fast rib direct cooling air against the second rib. The holes in the second rib direct cooling air against the pedestals.

Figure 2:
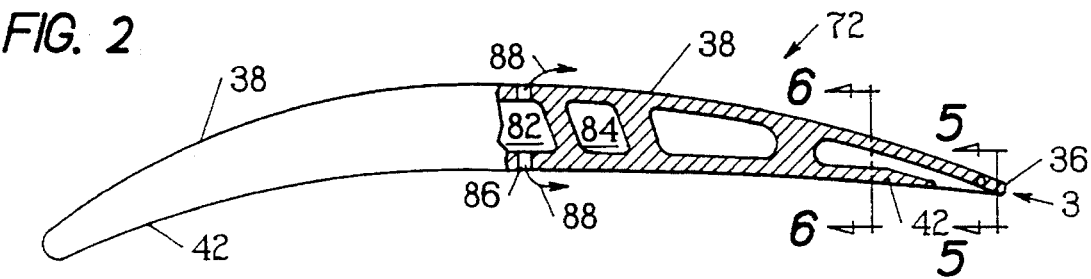
FIG. 2 is a cross-sectional view taken along the line 2—2 of FIG. 1.

FIG. 2 is an airfoil cross section taken along the lines 2—2 of FIG. 1 at approximately the 65% span location of the airfoil. The airfoil section is partially broken away and partly in section for city. The cooling air holes 86 extending through the second passage 84 direct cooling air outwardly and rearwardly as shown by the arrows 88. The suction sidewall 38 and the planar pressure sidewall 42 extend rearwardly. The pressure sidewall is cut away to form a thin trailing edge region 72 of the airfoil.

Figure 3:
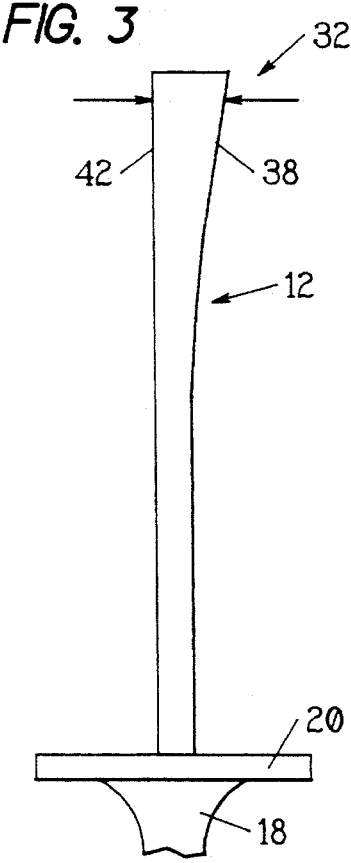
FIG. 3 is a diagrammatic view taken along the lines 3—3 of FIG. 1 showing the planar pressure surface and the diverging suction sidewall of the airfoil.

FIG. 3 is a diagrammatic representation of the airfoil 12 looking forwardly towards the trailing edge region 72 of the airfoil. The pressure sidewall is nearly planar along the entire length of the span. The pressure sidewall is planar to the extent needed to use a flat grinding device to remove material during manufacturing. The suction sidewall diverges from the pressure sidewall in the tip region of the airfoil. This causes the tip region to be much thicker in the circumferential direction than the spanwisely innermost portion of the airfoil. The airfoil tapers outwardly to its thickest portion.

Figure 2A:
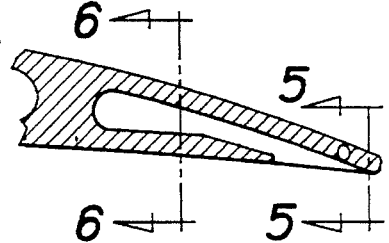
FIG. 2A is an enlarged view of a portion of FIG. 2.
Figure 4A:
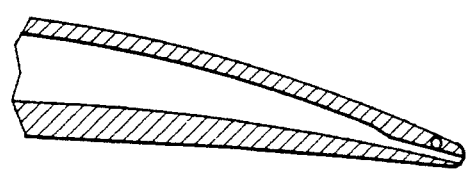
FIG. 4a is an enlarged view of a portion of FIG. 4.
Figure 4:
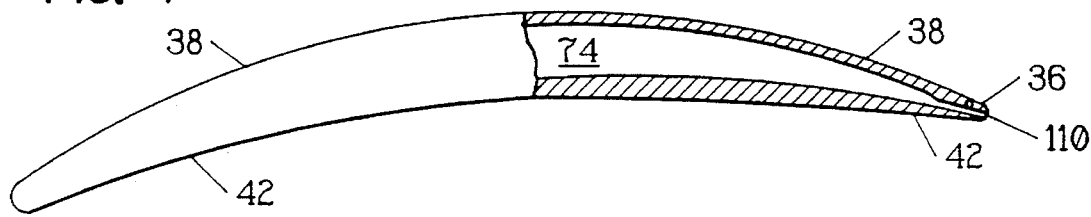
FIG. 4 is a cross-sectional view of tip of the airfoil showing the relationship of the pressure sidewall to the suction sidewall. And, in particular, illustrating the nearly parallel nature of the two sidewalls and the transition region which extends between the sidewalls.

FIG. 4 is a cross-sectional view taken along the line 4—4 of FIG. 1 and parallel to the sectional plane 2—2 shown in FIG. 1. As shown in FIG. 4, the pressure sidewall 42 and the suction sidewall 38 extend rearwardly side by side and nearly parallel to the nearly most rearward portion of the airfoil. In this region of the airfoil, a curved transition surface 110 (normally circular in cross-section) connects the suction sidewall to the pressure sidewall. Both the suction sidewall and the pressure sidewall are tangential to the transition surface circle. As shown in FIG. 4a, the diameter of the circular surface is approximately ninety (90) mils and is much smaller as shown in FIG. 2a. In a typical airfoil the smaller diameter as shown in FIG. 2 is about thirty (30) mils.

Figure 5:
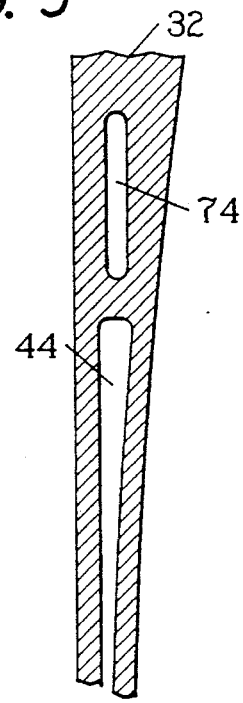
FIG. 5 is a view taken in the direction 5—5 of FIG. 2 to show the relationship of the sidewalls and with a portion of the tip broken away.
Figure 6:
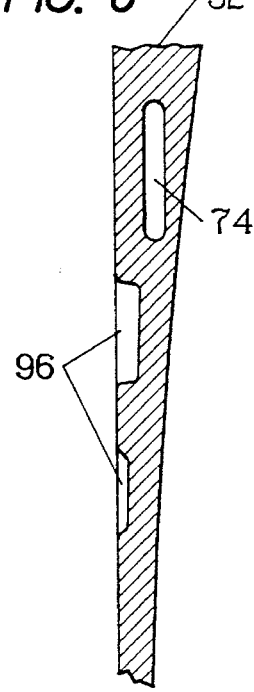
FIG. 6 is a view taken along the lines 6—6 FIG. 2 to show the relationship of the sidewalls and with a portion of the tip and the pedestals broken away for clarity.

FIG. 5 and FIG. 6 are sectional views taken along the line 5—5 and line 6—6 of FIG. 2. FIG. 5 is taken at a distance which is less than the diameter of the transition surface of the rearward most portion of the airfoil. As can be seen, the suction sidewall 38 and the pressure sidewall 42 bound the tip passage all the way to the rear of the pressure sidewall and suction sidewall.

During operation of the rotary machine, hot working medium gases are flowed over the exterior surface of the airfoil section. Heat is transferred from the gases to the suction sidewall 38 and the pressure sidewall 42. Cooling air is flowed from the first duct 24 via the first passage 56 in the radial spanwise direction and thence through the tip holes 95 through the tip of the airfoil. Additional amounts of cooling air are flowed via the impingement holes 64 in the impingement ribs 62 into the impingement spaces 58. The cooling air is impinged against the leading edge of the airfoil to cool the leading edge.

Cooling air is flowed from the second duct 26 via the supply passage 94 and directly from the second duct via the third 84 passage to the tip passage. The cooling air is then flowed chordwisely to the rear of the airfoil to cool the tip region. The tip region has a very high heat load because heat transfer is not only from the sidewalls. Heat is also transferred through the tip of the airfoil unit is also through the tip into the tip region of the airfoil. As cooling air is flowed radially outwardly in the second passage 82, cooling air is flowed to the exterior via the film cooling holes 86. These holes in the pressure sidewall and the suction sidewall provide film cooling to the exterior of the airfoil which cools the airfoil and which also blocks heat transfer from the hot gases of the working medium flow path to the air in the third passage. As a result the air in the third passage is relatively cool compared to the air in the second passage. The third passage air is much cooler than if it were not film cooled on its way to the tip of the airfoil.

A particular advantage of this construction is that the hotter air in the second passage is used for two purposes: 1) to film cool the airfoil; and 2) to prevent excessive heat transfer to the air in the third passage as it moves to the tip region. A second advantage of this construction is that the hotter air in the second passage is vented overboard prior to mixing with the cooler air from the third passage in the tip passage, again to provide the tip passage with lower temperature cooling air. The lower temperature cooling air is very effective for providing cooling to the tip of the airfoil.

Another advantage of the location of the chordwisely extending cooling air passage is that the supply passages 82, 84 are in the middle third of the air foil. The third passage 84 is located in a region which has a lower heat load than does the second passage. The higher heat load of the second passage is absorbed by the cooling air in the second passage and that heat energy is dumped overboard to preserve the cooler temperature of the air supplied by the third passage to the tip passage.

As the air in the tip passage 74 flows chordwisely rearwardly, it removes heat from the suction sidewall 38 and the pressure sidewall 42 which are shielding the interior of the airfoil. The shielding is not removed by a cutaway pressure surface by reason of the thickened tip which permits both a tip passage of adequate cross section to flow the cooling air out of the airfoil while providing a pressure sidewall and suction sidewall to shield the interior. Another benefit is that the radially extending cooling air passages in the tip may be extended further back in the tip region to provide cooling to this critical location of the tip.

The planar pressure sidewall 42 in the rearmost trailing edge region of the airfoil provides for ease of fabrication by grinding, for example, with a belt sander during finishing operation of the casting. If a non-linear trailing edge were used, grinding the trailing edge with a flat belt would tend to remove metal in critical locations that can result in an unacceptably thin wall in those areas.

The thicker tip region 32 of the airfoil avoids the difficulty in thin airfoils of installing a cooling air hole in one surface which might penetrate the other surface. Secondly, the thicker trailing edge tip region allows for a larger cross-sectional area at the exit of the tip passage. This prevents high local cooling air velocities which can cause a corresponding reduction in the local static pressure in the cooling air passage. This avoids an internal static pressure which drops below the static pressure of the gas path and maintains the necessary margin of safety against back flow. As will be realized, if the hot working medium gases flow into the airfoil because of the negative static pressure gradient, severe heating and possible cracking of the trailing edge region will result.

The thicker trailing edge region 32 also avoids the complication that occurs when installing abrasive grits on the blade tip. These grits are provided so that the turbine blade can rub acceptably against an abradable mating seal. The grit size is customarily set by considerations other than turbine aerodynamics or durability. For example, the grit size is the grit size picked to adequately rub the outer airseal. For a given grit size, the number of grits must necessarily decrease as the thickness of the trailing edge decreases. Thus, with thin trailing edges the designer may need to pick between the optimum grit count or the optimum grit size. This is avoided by using the thicker trailing edge.

Although this invention has been shown and described with respect to a preferred embodiment, it will be understood by those skilled in this art that various changes in form and detail thereof may be made without departing from the spirit and scope of the claimed invention.

We claim:

1. For a coolable airfoil structure of the type having a leading edge, a trailing edge, a root section in communication with a source of cooling air, a first end adjacent the root section, an airfoil tip region, and a second end at the tip region, the tip region including a chordwisely extending tip passage extending rearwardly through the tip region to the trailing edge, and a tip wall which bounds the tip passage, the improvement which comprises:

a first spanwisely extending supply passage and a second spanwisely extending supply passage, a rib which extends spanwisely to bound the first and second passages in the spanwise direction, each passage extending from the first end adjacent the root section toward the second end to the tip region and each independent of the other being in flow communication with the chordwisely extending tip passage, the first passage being disposed between the leading edge and the second passage and being chordwisely forward of the second passage and separated from the second passage only by the rib the first passage and second passage extending outwardly to supply cooling air to the tip region and the rib being spaced from the tip wall to permit mixing of the cooling air discharged from the first passage and the second passage;

a plurality of cooling air holes extending from the first forwardmost passage to the exterior of the airfoil to cool the surface of the airfoil adjacent the second rearmost passage to block heat transfer to the second rearmost passage from the exterior and to discharge a portion of the heated cooling air from the first forwardmost passage prior to the air mixing with air from the second passage in the tip passage.

2. A coolable rotor blade for an axial flow rotary machine, the coolable rotor blade having an exterior, which comprises:

a root section which adapts the rotor blade to engage a rotor assembly, the root section having a chordwisely extending root wall, a first duct adapted to be in fluid communication through the root wall with a source of cooling air, and a second duct adapted to be in fluid communication through the root wall with a source of cooling air and, a third duct adapted to be in fluid communication through the root wall with a source of cooling air;

an airfoil section having, a leading edge, a trailing edge, a suction sidewall, a pressure sidewall joined to the suction sidewall at the leading edge and the trailing edge and spaced from the suction sidewall to form a cavity therebetween, a tip region having a tip wall extending in a chordwise direction between the suction sidewall and the pressure sidewall, a first rib which extends in the spanwise direction to the tip wall and is spaced from the leading edge to divide the cavity into a rear portion and a front portion having a first passage, a second rib which extends in the spanwise direction and is spaced chordwisely from the first rib to divide the rear portion of the cavity into a trailing edge region and a midchord region and which extends in the chordwise direction and is spaced spanwisely from the tip wall leaving a tip passage in flow communication with the midchord region, a third rib which is spaced from the tip wall and extends in the spanwise direction to divide the midchord region of the blade into a second passage and a third passage which each extend spanwisely outwardly away from the root section toward the tip wall, the second and third passages each being bounded by the third rib and each being in flow communication with the second duct such that the cooling air for each mid-chord region passage does not pass through the other mid-chord region passage and each being in flow communications with the tip passage, wherein a plurality of cooling air holes extend through the pressure sidewall and the suction sidewall to place the second passage in flow communication with the exterior of the blade and to duct cooling air over the exterior of the blade and in the direction of the trailing edge under operative conditions to block the transfer of heat from the exterior to cooling air flowing in the third passage to increase the cooling effectiveness of the air in the third passage in the tip region of the airfoil and wherein the spacing of the third rib from the tip wall permits the mixing of the cooling air discharged from the second passage and the third passage.

3. The coolable rotor blade of claim 2, which further has a trailing edge circle at the trailing edge which is tangent to the suction sidewall and pressure sidewall and wherein the pressure sidewall surface in the trailing edge region is substantially planar such that the pressure sidewall surface is workable with a flat grinding surface and wherein the suction sidewall diverges in the spanwisely outward direction from the pressure sidewall to thicken the tip region without affecting the planar surface of the pressure sidewall but is of a thickness such that the tip passage is bounded by the pressure sidewall and the suction sidewall at least at a location which is spaced forwardly from the trailing edge by distance which is equal to approximately one-half the diameter of a the trailing edge circle which is tangent at the rearmost portion of the trailing edge to the suction sidewall and the pressure sidewall.

4. The coolable rotor blade of claim 2 wherein the cooling air holes extend through the suction sidewall over at least the outermost fifty (50%) percent of the span of the suction sidewall of the airfoil and over at least the outermost eighty (80%) percent of the span of the pressure sidewall of the airfoil.

5. The coolable rotor blade of claim 4 wherein the cooling air holes extend through the suction sidewall over at least the outermost sixty (60%) percent span of the suction sidewall of the airfoil and over the outermost ninety percent span of the pressure sidewall of the airfoil.

6. The coolable rotor blade for an axial flow rotary machine of claim 2 wherein the third passage is in the middle third portion of the air foil as measured in the chordwise direction.

* * * * *